(12) United States Patent
Heller et al.

(10) Patent No.: US 11,378,004 B2
(45) Date of Patent: Jul. 5, 2022

(54) LENGTH-ADJUSTABLE CONNECTING ROD WITH REDUCED-MASS OUTLET VALVE

(71) Applicants: IWIS MOTORSYSTEME GMBH & CO. KG, Munich (DE); AVL LIST GMBH, Graz (AT)

(72) Inventors: Malte Heller, Munich (DE); Kai Arens, Munich (DE); Zoltán Riba, Olching (DE); Martin Bodensteiner, Munich (DE); Steffen Latz, Munich (DE); Bernhard Kometter, Judendorf (AT); Robert St. John, Graz (AT); Wilhelm Greylinger, Mürzzuschlag (AT); Heinrich Fürhapter, Graz (AT); Siegfried Lösch, Graz (AT)

(73) Assignees: IWIS MOTORSYSTEME GMBH & CO. KG, Munich (DE); AVL LIST GMBH, Graz (AT)

( * ) Notice: Subject to any disclaimer, the term of this patent is extended or adjusted under 35 U.S.C. 154(b) by 0 days.

(21) Appl. No.: 17/283,235

(22) PCT Filed: Oct. 8, 2019

(86) PCT No.: PCT/AT2019/060334
§ 371 (c)(1),
(2) Date: Apr. 6, 2021

(87) PCT Pub. No.: WO2020/073067
PCT Pub. Date: Apr. 16, 2020

(65) Prior Publication Data
US 2021/0348551 A1 Nov. 11, 2021

(30) Foreign Application Priority Data
Oct. 8, 2018 (AT) .............................. A 50866/2018

(51) Int. Cl.
*F02B 75/04* (2006.01)
*F16C 7/06* (2006.01)
*F02D 15/02* (2006.01)

(52) U.S. Cl.
CPC .............. *F02B 75/045* (2013.01); *F16C 7/06* (2013.01); *F02D 15/02* (2013.01)

(58) Field of Classification Search
CPC ........... F02B 75/045; F02D 15/02; F16C 7/06
See application file for complete search history.

(56) References Cited

U.S. PATENT DOCUMENTS

| 2015/0152794 | A1  | 6/2015 | Paul |
| 2018/0010516 | A1* | 1/2018 | Eckrich ..................... F16C 7/06 |
| 2018/0266313 | A1* | 9/2018 | Melde-Tuczai ....... F16K 11/048 |

FOREIGN PATENT DOCUMENTS

| AT | 15006 U2 * | 8/2016 | ............ F02B 75/045 |
| AT | 519932 A2  | 11/2018 | |

(Continued)

*Primary Examiner* — George C Jin
*Assistant Examiner* — Teuta B Holbrook
(74) *Attorney, Agent, or Firm* — BakerHostetler

(57) ABSTRACT

A length-adjustable connecting rod for an internal combustion engine, where the connecting rod includes at least one switchable outlet valve for opening and closing a pressure chamber, where the outlet valve comprises a valve body and a closing body that is operatively connected to the valve body, and a closing mechanism is present acting upon the closing body for directly moving the closing body and indirectly moving the valve body from a closed to an open position or vice versa. Such an outlet valve is to be configured to be operable. For this purpose, this closing body has a mass which is smaller than the volume defined by the envelope contour of the closing body multiplied by the density of steel (7.85 g/mm$^3$). The use of such a closing body for a respective length-adjustable connecting rod is also provided.

10 Claims, 4 Drawing Sheets

(56) References Cited

FOREIGN PATENT DOCUMENTS

| DE | 10 2015 109 474 A1 | 10/2016 |
|---|---|---|
| DE | 10 2017 106 939 A1 | 12/2017 |
| WO | 2018/007534 A1 | 1/2018 |

\* cited by examiner

LENGTH-ADJUSTABLE CONNECTING ROD WITH REDUCED-MASS OUTLET VALVE

CROSS-REFERENCE TO RELATED APPLICATIONS

This application is a National Stage of International patent application PCT/AT2019/060334, filed on Oct. 8, 2019, which claims priority to foreign Austrian patent application No. AT A 50866/2018, filed on Oct. 8, 2018, the disclosures of which are incorporated by reference in their entirety.

FIELD OF THE INVENTION

The present invention relates to a length-adjustable connecting rod for an internal combustion engine, where the connecting rod comprises at least one switchable outlet valve for opening and closing a pressure chamber, where the outlet valve comprises a valve body and a closing body that is operatively connected to the valve body, and a closing mechanism is present acting upon the closing body for directly moving the closing body and indirectly moving the valve body from a closed to an open position or vice versa.

BACKGROUND

The thermal degree of efficiency η of spark ignition engines is dependent on the compression ratio ε, i.e. the ratio of the total volume prior to compression to the compression volume ($\varepsilon =$ (displacement volume $V_h$+compression volume $V_c$)/compression volume $V_c$). As the compression ratio increases, the thermal efficiency increases. The increase in thermal efficiency over the compression ratio is degressive, but, in the range of values that are common today ($\varepsilon =$ 10 . . . 14), it is still relatively pronounced.

In practice, the compression ratio cannot be increased arbitrarily. For example, too high a compression ratio in spark ignition engines leads to knocking. In this case, the mixture is ignited by the increase in pressure and temperature during compression and not by the ignition spark. This premature combustion not only leads to an uneven run, but can cause component damage.

The compression ratio, from which knocking occurs, depends, inter alia, on the operating point (n, T, throttle position, etc.) of the engine. Higher compression is possible in the partial load range. Therefore, it is endeavored to adjust the compression ratio to the respective operating point. There are different approaches to the development. In the present case, the compression ratio is to be adjusted by way of the connecting rod length. The connecting rod length influences the compression volume. The displacement is determined by the position of the crankshaft journal and the cylinder bore. A short connecting rod therefore leads to a smaller compression ratio than a long connecting rod with otherwise identical geometric dimensions (crankshaft, cylinder head, valve timing, etc.)

In the present case, the connecting rod length is to vary hydraulically between two positions, the connecting rod is therefore configured to be adjustable in length. The mode of operation of an embodiment shall be explained briefly hereafter. The entire connecting rod is there configured to be multi-part, where the change in length is effected by a telescopic mechanism. The connecting rod comprises a double-action hydraulic cylinder. The connecting rod small end (piston pin) is connected to a piston rod on which a piston is arranged. The piston is guided in an axially slidable manner in a cylinder which is arranged in the connecting rod member with the connecting rod large end (crankshaft journal). The piston separates the cylinder into two chambers (upper and lower pressure chamber). The two chambers are supplied with a hydraulic medium, e.g. engine oil, via check valves. If the connecting rod is disposed in the long position, there is no oil present in the upper pressure chamber. The lower pressure chamber, on the other hand, is completely filled with oil. During operation, the connecting rod is subjected to alternating pull and push forces due to the gas and mass forces. In the long position of the connecting rod, a pull force is absorbed by mechanical contact with an upper stop of the piston. As a result, the connecting rod length does not change. A push force applied is transmitted via the piston surface to the lower chamber filled with oil. Since the check valve of this chamber prevents oil from returning, the oil pressure increases. The connecting rod length does not change. The connecting rod is hydraulically locked in this direction.

The situation is reversed in the short position. The lower chamber is empty, the upper chamber is filled with oil. A pull force causes a pressure increase in the upper chamber. A push force is absorbed by a mechanical stop.

The connecting rod length can be adjusted in two steps in that one of the two chambers is emptied. One of the two respective inlet check valves is there bridged by an associated return flow channel. Oil can flow through this return flow channel independently of the pressure difference between the pressure chamber and the supply member. The respective check valve therefore loses its effect.

The two return flow channels are opened and closed by a control valve, where precisely one return flow channel is always open, the other is closed. The actuator for switching the two return flow channels is actuated hydraulically by the supply pressure. The oil supply is provided by the lubrication of the connecting rod bearing. For this purpose, an oil passage is required from the crankshaft journal via the connecting rod bearing to the connecting rod.

Switching is effected by selectively emptying one of the two pressure chambers by making use of the mass and gas forces acting at the connecting rod, where the respective other pressure chamber is supplied with oil by an inlet check valve and is hydraulically blocked.

A connecting rod that can be adjusted in length by telescoping for adjusting the compression ratio in the internal combustion engine is described, for example, in WO 2018/007534 A1. In a variant of this known publication, an actuating piston is provided which controls the outlet valves for the pressure chambers. For this purpose, the valve bodies (spherical shape) comprise plunger-like closing bodies formed thereon which can be opened and closed by way of the control plunger on the actuating piston. The compression ratio can also be changed by way of an eccentric on the connecting rod small end. The eccentric can also be actuated hydraulically.

A connecting rod is naturally exposed to very high acceleration forces. These acceleration forces must also be taken into account in the hydraulic switching of a length-adjustable connecting rod. It is therefore endeavored to construct parts of the hydraulic switching, presently the outlet valve, in such a way that an operational unit is created during the operation of the internal combustion engine.

SUMMARY OF THE INVENTION

It is therefore the object of the present invention to improve a length-adjustable connecting rod of the kind mentioned at the outset in such a way that a fully operational outlet valve is created even with the small installation space available.

This object is satisfied according to the invention in that the closing body has a mass which is smaller than the volume defined by an envelope contour of the closing body multiplied by the density of steel (7.85 g/mm³). The envelope contour means substantially the smallest packaging contour that only follows the outer contour of the closing body and does not take into account recesses, grooves, bores, etc., provided it is flanked by an adjacent larger region of the closing body. As a rule, however, closing bodies are simple geometric components. In addition to the use of selectively preformed material removal or the formation of a hollow body, weight reduction can also be performed by using a material having a lower density than steel. With the connecting rod in rotation and depending on the rotational speed of the internal combustion engine, the forces there generated can exert an opening force by the closing body upon the valve body in dependence on the orientation of the outlet valve. In the closed position of the valve body, this should not lead to unintentional switching of the outlet valve. The solution according to the invention achieves a lower weight of the closing body so that the circumstances are all the more advantageous and a valve spring that may be present can be configured much better. The force of the closing body acting upon the closing mechanism is also reduced by this measure.

It has been found to be particularly advantageous if, according to a variant, the closing body is fabricated from ceramic material. Technical ceramic materials are very strong materials that can withstand the high demands in the present field of application. In addition, they have a lower density than steel, for which reason they can also be designed as solid material. Such closing bodies can also be produced, for example, by sintering and in any number of shapes.

The closing body is advantageously made of a material having an average density of less than 4.5 g/mm³, preferably less than 2.7 g/mm³. Such limit values, which in the present case are specified by the material titanium and the material aluminum which are generally less suitable materials for the present application, can be adhered to in particular using ceramic materials. Due to the fact that the mass of the closing body is generally lower than the mass of the valve body, the closing body with such a mass reduction exerts little influence on the valve body at respective accelerations. The influence on the locking mechanism is also reduced.

It has been found to be particularly advantageous for the structure to have the valve body and the closing body be two separate bodies. Geometrically simple bodies, such as two spheres, can presently be used. The valve body and/or the closing body preferably have a spherical shape.

The spherical shape has the smallest volume with the largest possible surface, as a result of which this body has a favorable shape and is used preferably. The interaction of two spheres is considered to be manageable and advantageous for the outflow of the hydraulic fluid.

Spherical valve bodies are well known and easy to manage. The outflowing hydraulic fluid flows around a spherical closing body very well and therefore also has good hydraulic properties in addition to its small volume. The closing body is typically arranged on the low-pressure side and is therefore exposed to the outgoing flow of the outlet valve.

In another variant, the closing body is connected to the closing section of the valve body on the low-pressure side and there is in engagement with the closing mechanism and/or can be made to engage there with the closing mechanism. The closing body can then be configured to be formed integrally with the valve body. The determination of the envelope contour of the closing body is generally very simple because the closing body is typically attached to the valve body as an extension and needs to extend through the valve opening. The valve body in any case includes the closing section that rests on the valve seat. The part that is physically separated therefrom and extends through the valve opening is then associated with the closing body. The connection of the valve body and the closing body offers other options for configuring the closing mechanism, because it is not necessary to secure the closing body when the outlet valve is closed.

For the mass of the closing body to have little effect on the valve body, the envelope volume of the valve body is preferably larger than the envelope volume of the closing body.

Furthermore, it has been found that the acceleration acting upon the outlet valve can be best managed if the closing axis of the valve body of the outlet valve is aligned according to a variant at an angle of ±45° relative to the axis of the crankshaft driving the connecting rod. In other words, the closing axis of the valve body of the outlet valve is aligned inclined to the axis of the crankshaft driving the connecting rod, where the angle of inclination is in an angular range between −45° and +45°. Alignment of the closing axis exactly 90° to the crankshaft axis can lead to disadvantages during operation. This is to be avoided and appropriate use of the range specified ensures lower inertial forces.

It is therefore preferred according to a further variant to have the closing axis of the valve body of the outlet valve be aligned substantially parallel to the axis of the crankshaft driving the connecting rod. The alignment of the valve seat and the configuration of the valve body must certainly also be taken into account there. As a rule, however, the influence due to the accelerations arising at the connecting rod during operation is minimized with this alignment.

According to an advantageous design specification (in particular according to a specification of claim 8), the outlet valve can comprise a valve spring pressing the valve body against a valve seat, where the spring preloading force of the valve spring is selected when the connecting rod is at a standstill such that the force calculated from normal operation is at a maximum and the acceleration arising at the valve body multiplied by the mass of the valve body and divided by the tangent $\alpha$ is smaller than the spring preloading force, where a is the angle between the touching tangent of the valve seat at the valve body and a vertical to the closing axis of the outlet valve. To determine angle $\alpha$, the touching tangent and the closing axis must of course be disposed in one plane. This specification ensures that the spring force is sufficient during operation to keep the closed outlet valve indeed closed.

The invention further relates to the use of a closing body for a length-adjustable connecting rod in one of the configurations described above. This closing body has a mass which is smaller than the volume defined by an envelope contour of the closing body multiplied by the density of steel (7.85 g/mm³). Such advantageous closing bodies make the configuration of an outlet valve and the associated closing mechanism for a telescopic connecting rod simpler.

BRIEF DESCRIPTION OF THE DRAWINGS

The present invention shall be explained hereafter in more detail using a non-restricting exemplary embodiment shown in the drawings, where.

DETAILED DESCRIPTION

Figure 1:
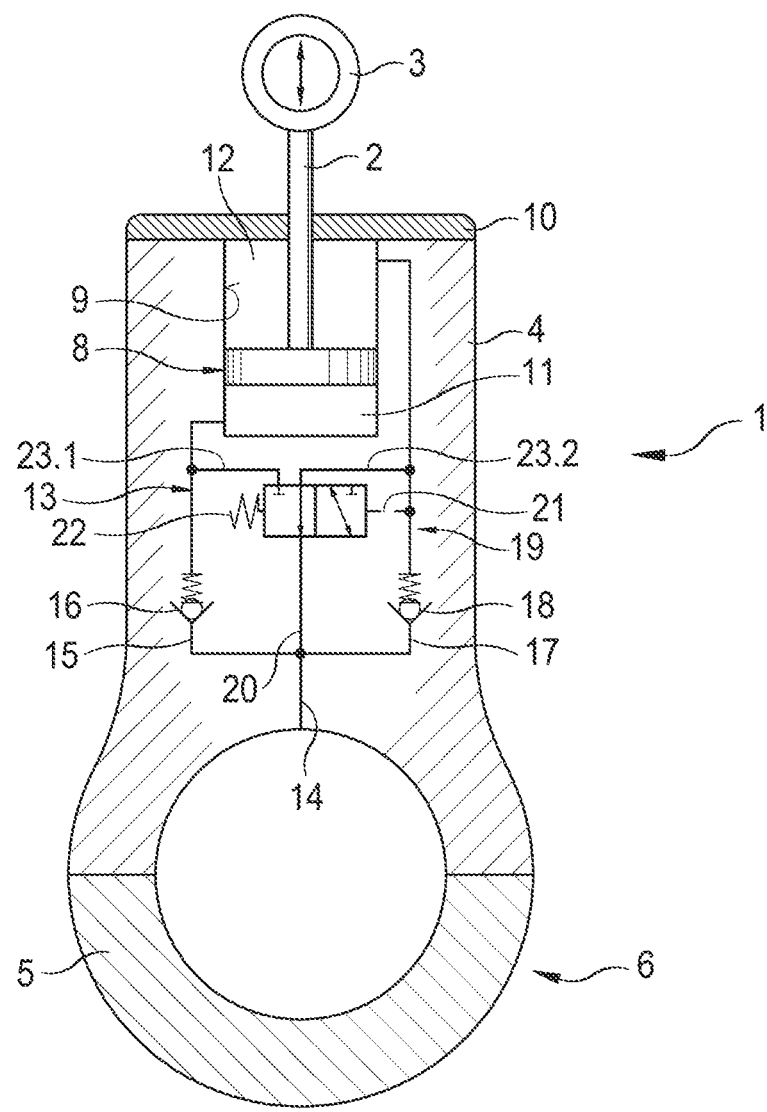
FIG. 1 shows the schematic functional representation of a length-adjustable, in particular telescopic, connecting rod.

A length-adjustable, telescopic connecting rod 1 with which a variable compression ratio can be implemented in an internal combustion engine is shown in FIG. 1 schematically and by way of example. Connecting rod 1 comprises a movably arranged first rod member 2, at the upper end of which a connecting rod small end 3 is arranged. Second rod member 4 comprises a lower bearing shell 5 which, together with the lower region of second rod member 4, surrounds connecting rod large end 6. Lower bearing shell 5 and the upper region of second connecting rod member 4 are connected to one another in typical manner by way of fastening devices. The lower end of first rod member 2 is provided with an adjustable piston 8 which is guided movable in a piston bore 9. Second connecting rod member 4 at the upper end comprises a cover 10 through which first rod member 2 passes and is sealed. Cover 10 therefore seals off cylinder bore 9 entirely. A first pressure chamber 11 having a circular cross-section is formed below adjustable piston 8 and a circular ring-shaped second pressure chamber 12 is formed above adjustable piston 8. In addition to the circular shape according to the present embodiment, other cross-sectional shapes, e.g. ellipses or polygons, can of course also be implemented.

Adjustable piston 8 and cylinder bore 9 are part of an adjustment mechanism for varying the connecting rod length. Part of the adjustment mechanism is also a hydraulic actuation circuit 13 which is later to be described in more detail and which respectively provides for an inflow or outflow of the hydraulic fluid into or respectively out of pressure chambers 11 and 12 and thus for a motion of adjustable piston 8 or which locks the latter. Hydraulic actuation circuit 13 in the embodiment illustrated is operated with engine oil. For this purpose, an oil supply channel 14 is in communication with connecting rod large end 6, through which engine oil can be supplied to hydraulic actuation circuit 13 or possibly flow out from the latter. Oil supply channel 14 branches into different sections (partial channels). A first section 15 is in communication with first pressure chamber 11 to ensure an inflow into first pressure chamber 11. Additionally disposed in section 15 is a first check valve 16 which is intended to prevent the immediate outflow of the oil from first pressure chamber 11, but allows the inflow into first pressure chamber 11 at any time. A second section 17 is in communication with second pressure chamber 12 to allow the inflow of oil into second pressure chamber 12. Disposed in second section 17 is a second check valve 18 which prevents the immediate outflow of oil from second pressure chamber 12, but allows the inflow at any time.

Furthermore, a control valve 19 having two switching positions is provided. Control valve 19 is in direct communication with a third section 20 of oil supply channel 14. Control valve 19 in one of its two switching positions acts either as an outflow valve for the outflow of hydraulic fluid from second pressure chamber 12 or in its second switching position as an outflow valve for the outflow of hydraulic fluid from first pressure chamber 11. The respective other pressure chamber 11 and 12 is hydraulically blocked in the respective associated switching position, as a result of which first rod member 2 assumes either the retracted or the extended position. Control valve 19 is switched by way of a control line 12 which is in communication with second section 17 downstream of second check valve 18 and with a return spring 22 which forces control valve 19 to the first switching position shown in FIG. 1. The second switching position is obtained by creating an increased pressure level in oil supply channel 14, so that control valve 13 is forced to the second switching position against the force of return spring 22. Corresponding first and second return flow channels 23.1 and 23.2 are in communication with control valve 19 in the associated section portions of first and second sections 15, 17 to enable a respective outflow from first pressure chamber 11 and second pressure chamber 12.

It is to be noted that hydraulic actuation circuit 13 can also comprise additional elements, channels, valves, etc. or can be configured differently for providing the desired adjustment function. The hydraulic circuit diagram of hydraulic actuation circuit 13 is therefore only representative of the mode of operation and not of the concrete configuration.

Figure 2:
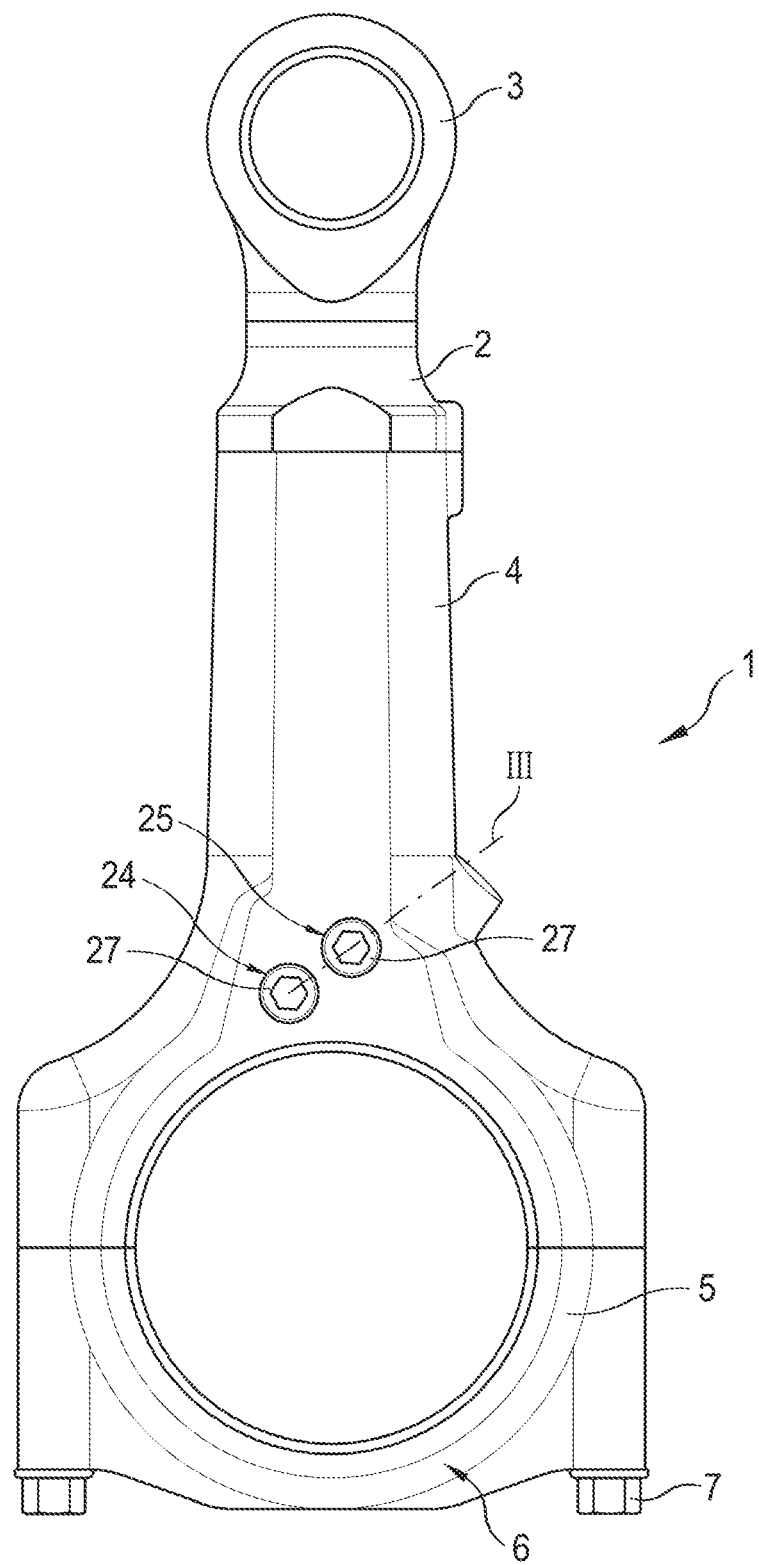
FIG. 2 shows a front view of an embodiment of a telescopic connecting rod.
Figure 3:
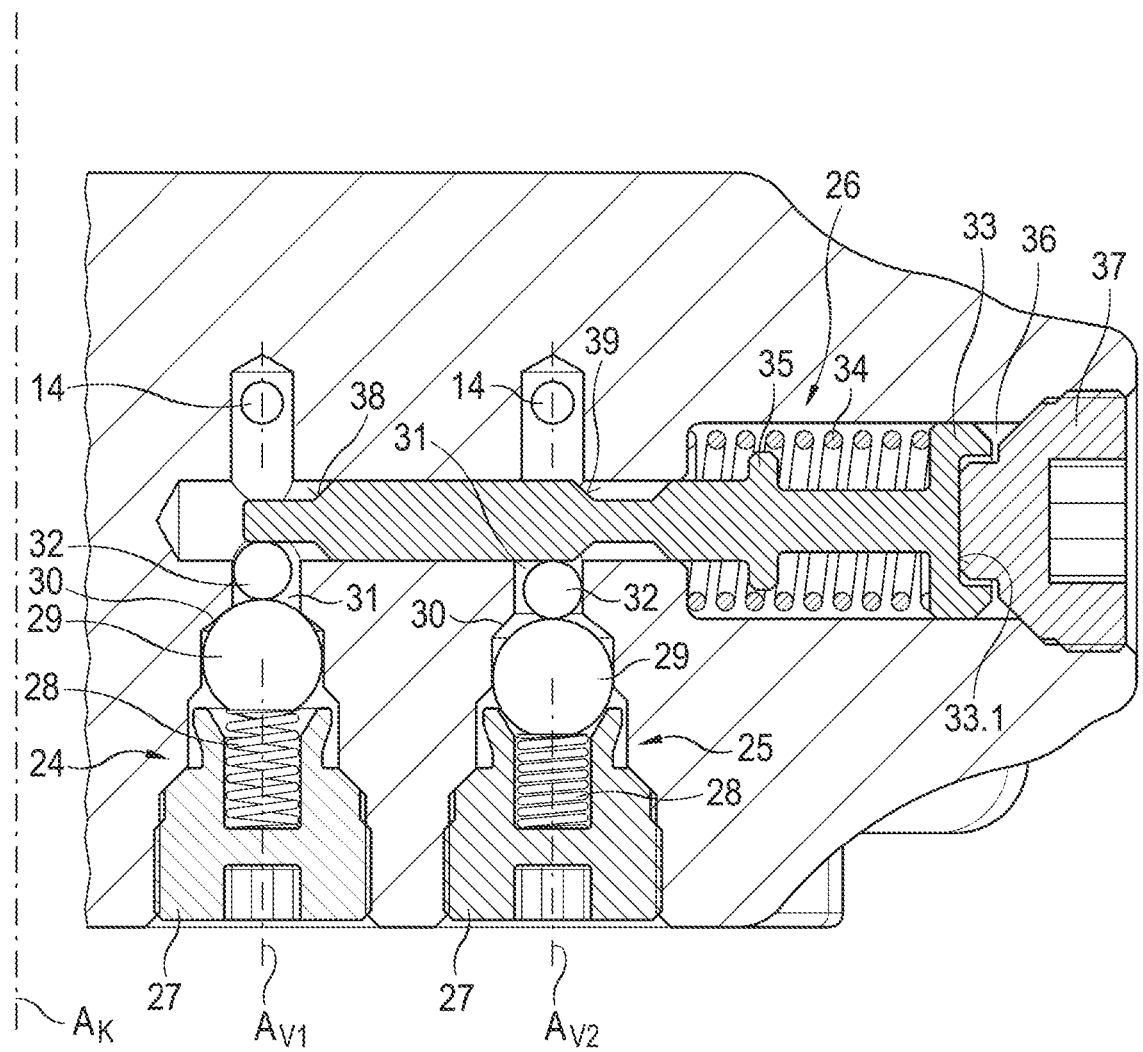
FIG. 3 shows an enlarged detail of the telescopic connecting rod from FIG. 2 along the line III-III.

An embodiment of control valve 19 according to the invention shall be explained in more detail hereafter with reference to FIGS. 2 and 3.

FIG. 2 first shows a telescopic connecting rod 1 elaborated in more detail with first rod member 2 and second rod member 4. Since only the essential differences to the preceding schematically illustrated connecting rod 1 shall be discussed hereafter, the above description is additionally made reference to using the same reference characters. Sectional line III reproduces the section plane as shown in FIG. 3. This mainly shows and describes the structure of control valve 19 in more detail. Control valve 19 comprises a first outlet valve 24 and a second outlet valve 25. Furthermore, a control slide 26 is part of control valve 19.

Both outlet valves 24 and 25 have the same structure, which is why the associated elements are described only with reference to first outlet valve 24. Outlet valve 24 comprises a closure screw 27 which is screwed into a corresponding threaded receiving opening in second rod member 4. A valve spring (helical compression spring) 28 acting upon spherical valve body 29 is arranged in closure screw 27. Spherical valve body 29 interacts with a conical valve seat 30 which opens into a valve opening 31. A likewise spherical closing body 32 is arranged in valve opening 31. First outlet valve 24 is shown in FIG. 3 in the closed position and second outlet valve 25 is shown in the open position. This corresponds to the switching position of control valve 19 in FIG. 1.

Outlet valves 24 and 25 are actuated by way of control slide 26. Control slide 26 can be actuated hydraulically and is in communication with the engine oil hydraulics. By increasing the pressure using the oil pump, pressure acts upon one side on a piston surface 33.1 of piston 33 of control slide 26. As a result, control piston 26 is moved to the left-hand side (according to the arrangement in FIG. 3) against the action of control piston spring 34. For this purpose, control slide 26 comprises a stop flange 35 which determines the second position. A closure screw 37 is provided for closing off pressure chamber 36 associated with piston 33. Control slide 26 comprises a first switching cam 38 and a second switching cam 39. In this context, switching cams are to be understood as being ramps or elevations which, with a motion of control slide 26, trigger a motion in adjacent elements that is normal to the motion of control slide 26. Switching cams 38 and 39 each act upon associated closing body 32 which then moves valve body 29 as a result. In the position of control slide 26 shown in FIG. 3, there is so much play between control slide 26 and closing body 32 that valve body 29 is seated securely on valve seat 30 and is not impaired by closing body 32. Closing body 32 associated with second outlet valve 25 comprises a raised position in the position of control slide 26 shown in FIG. 3. Closing body 32 therefore acts upon valve body 29 and consequently compresses valve spring 28 and thereby presses valve body 29 away from valve seat 30. Second outlet valve 25 is thus opened. The oil can flow out of second pressure chamber 12 while first pressure chamber 11 is blocked.

If control slide 26 now moves to the left-hand side, then closing body 32 of second outlet valve 25 slides downwardly on control cam 39 to another position and releases valve body 29, so that valve spring 28 subsequently presses valve body 29 onto valve seat 30 and closes second outlet valve 25. Closing body 32 of first outlet valve 24 then slides upwardly on control cam 38, whereby associated valve body 29 there as well is pushed away from the axis of control slide 26. At the same time, associated valve spring 28 compresses and valve body 29 lifts off valve seat 30. As a result, the second valve position of control valve 19 is then assumed. This results in the short position of the telescopic connecting rod.

Connecting rod 1 and thereby its components are exposed to high acceleration forces during operation. Respective centrifugal forces arise alone due to the rotational motion about axis $A_K$ of the crankshaft which is drawn in symbolically in FIG. 3. For this reason, it is advantageous to have closing bodies 32 have the lowest possible weight. In the present case, closing bodies 32 are produced from ceramic material having a density of approx. 2.5 g/mm³. Since closing body 32 is a solid body in the present case, the envelope contour is a sphere, just like actual closing body 32. The mass of this closing body is therefore smaller than the volume defined by an envelope contour of the closing body multiplied by the density of steel. For the present invention that is assumed to be 7.85 g/mm³.

Alternatively, closing body 32 can also be configured as an extension of valve body 29, e.g. be formed integrally therewith.

The alignment of closing axes $A_{V1}$ and $A_{V2}$ of outlet valves 24, 25 is there also of importance. They are aligned parallel to axis $A_K$ of the crankshaft (and are therefore disposed in the range of ±45° relative to axis $A_K$). The influence of the mass of closing body 32 upon valve spring 28 is then minimized.

Figure 4:
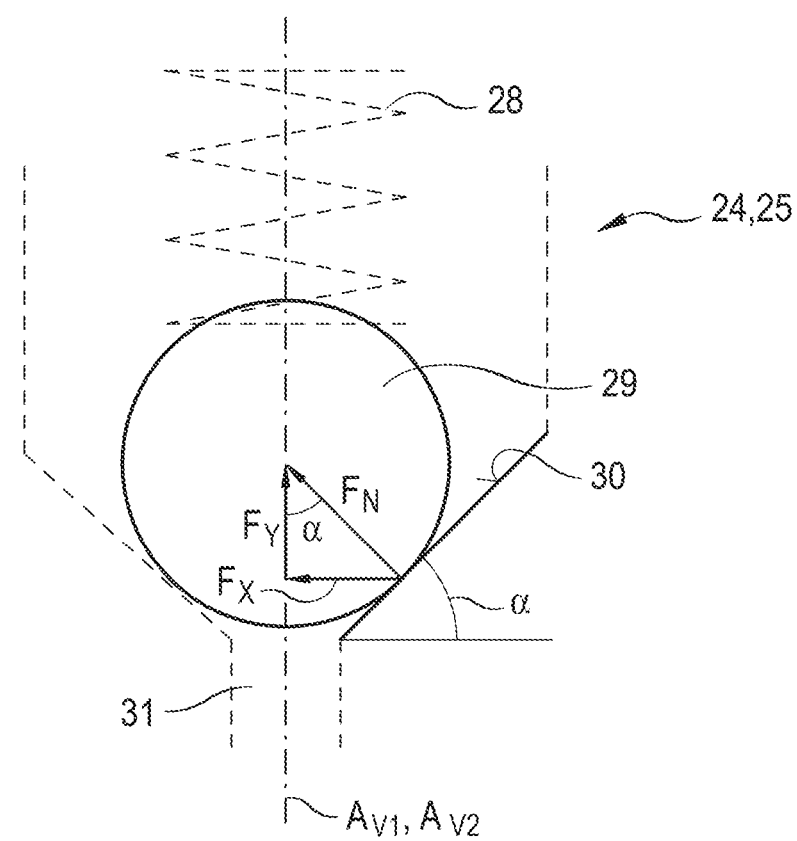
FIG. 4 shows a schematic representation of the force relationship on the valve body of an outlet valve.

The forces arising upon valve body 29 shall explained hereafter in more detail with reference to FIG. 4. The configuration of valve body 29 and the alignment of valve seat 30 have an important influence on this. Valve seat 30 is formed having an angle α. Due to the conical shape, the touching tangent between valve seat 30 and valve body 29 runs exactly in the surface of valve seat 30 at an angle α (presently 45°) relative to closing axes $A_{V1}$ and $A_{V2}$. This angle α is measured relative to a vertical to closing axes $A_{V1}$ or $A_{V2}$, respectively. In the installation position selected, a force component $F_X$ acts upon valve body 29 due to the crankshaft motion. It has the value of the product of the mass of spherical valve body 29 times the maximum acceleration arising. The maximum acceleration arises from the maximum rotational speed of the internal combustion engine. This gives rise to force component $F_Y$ counteracting the closing force of valve spring 28. Its value is $F_X$ divided by tangent α. The mass of closing body 32 does not actually play a role in this consideration due to the installation position selected. However, the mass of closing body 32 has an influence on the actuating force to be made available by way of control slide 26 and the pretensioning force of control slide spring 34. Acceleration forces act also upon closing body 32 and are noticeable in a similar way at control cams 38 and 39 of control slide 26 and have an influence on control slide spring 34 and the control pressure to be made available in pressure chamber 36. For this reason, the mass should be as small as possible.

LIST OF REFERENCE CHARACTERS 1 telescopic connecting rod
2 first rod member
3 connecting rod small end
4 second rod member
5 lower bearing shell
6 connecting rod large end
7 fastening device
8 adjustable piston
9 piston bore
10 cover
11 first pressure chamber
12 second pressure chamber
13 actuation circuit
14 oil supply channel
15 first section
16 first check valve
17 second section
18 second check valve
19 control valve
20 third section
21 control line
22 return spring
23.1 first return flow channel
23.2 second return flow channel
24 first outlet valve
25 second outlet valve
26 control slide
27 closure screw
28 valve spring
29 valve body
30 valve seat
31 valve opening
32 closing body
33 piston
33.1 piston area
34 control slide spring
35 stop flange
36 pressure chamber
37 closure screw
38 control cam
39 control cam
$A_K$ crankshaft axis
$A_{V1}$ closing axis first outlet valve
$A_{V2}$ closing axis second outlet valve

The invention claimed is:
1. A length-adjustable connecting rod for an internal combustion engine, where said connecting rod comprises at least one switchable outlet valve for opening and closing at least one pressure chamber, where said outlet valve comprises a valve body and a closing body operatively connected to said valve body and a closing mechanism is present acting upon said closing body for directly moving said closing body and indirectly moving said valve body from a closed to an open position or vice versa, wherein said closing body has a mass which is smaller than the volume defined by an envelope contour of said closing body multiplied by the density of steel (7.85 g/mm³).

2. The length-adjustable connecting rod according to claim 1, wherein said closing body is produced from ceramic material.

3. The length-adjustable connecting rod according to claim 1, wherein said closing body is made of a material having an average density of less than 4.5 g/mm³, preferably less than 2.7 g/mm³.

4. The length-adjustable connecting rod according to claim 1, wherein said valve body and said closing body are configured as two separate bodies, where in particular said valve body and/or said closing body have a spherical shape.

5. The length-adjustable connecting rod according to claim 1, wherein said closing body is connected to a closing section of said valve body on a low-pressure side and is there in engagement with said closing mechanism and/or can be made to engage there with said closing mechanism.

6. The length-adjustable connecting rod according to claim 1, wherein the envelope volume of said valve body is larger than the envelope volume of said closing body.

7. The length-adjustable connecting rod according to claim 1, wherein the closing axis ($A_{V1}$, $A_{V2}$) of said valve body of said outlet valve is aligned at an angle of ±45° relative to the axis ($A_K$) of a crankshaft driving said connecting rod.

8. The length-adjustable connecting rod according to claim 1, wherein said closing axis ($A_{V1}$, $A_{V2}$) of said valve body of said outlet valve is aligned substantially parallel to said axis ($A_K$) of a crankshaft driving said connecting rod.

9. The length-adjustable connecting rod according to claim 1, wherein said outlet valve comprises a valve spring pressing said valve body against a valve seat and the spring preloading force of said valve spring is selected when said connecting rod is at a standstill such that the force calculated from the maximum acceleration during normal operation arising at said valve body multiplied by the mass of said valve body and divided by touching tangent α is smaller than the spring preloading force, where α is the angle between said touching tangent of said valve seat at said valve body and a vertical to said closing axis ($A_{V1}$, $A_{V2}$).

10. A use of a closing body in a length-adjustable connecting rod according to claim 1, wherein said closing body has a mass which is smaller than the volume defined by an envelope contour of said closing body multiplied by the density of steel (7.85 g/mm³).

* * * * *